March 23, 1954 I. JEPSON ET AL Re. 23,804

COFFEE MAKER

Original Filed March 5, 1937 2 Sheets-Sheet 1

Inventor:
Ivar Jepson
& George Browning
By
Wilson, Dowell, McLanna & Winterson
Attys.

COFFEE MAKER

Original Filed March 5, 1937 2 Sheets-Sheet 2

Inventor:
Ivar Jepson &
George Browning
By
Wilson, Dowell
McCanna & Winterrowd
Attys.

Reissued Mar. 23, 1954

Re. 23,804

UNITED STATES PATENT OFFICE 23,804

COFFEE MAKER

Ivar Jepson, Oak Park, and George Browning, Wilmette, Ill., assignors to Sunbeam Corporation, a corporation of Illinois Original No. 2,269,111, dated January 6, 1942, Serial No. 129,163, March 5, 1937. Renewed April 4, 1940. Application for reissue November 15, 1952, Serial No. 320,844

32 Claims. (Cl. 219—43)

Matter enclosed in heavy brackets [ ] appears in the original patent but forms no part of this reissue specification; matter printed in italics indicates the additions made by reissue.

This invention relates to cooking devices, and in many aspects deals more particularly with electric coffee makers.

An important object of the invention is the provision of a coffee maker of generally improved form having a novel arrangement of parts operative in the making and serving of coffee.

Another object of the invention is the provision of a coffeemaking device having improved control means.

Another object of the invention is the provision of a coffee maker having coffee making and coffee storing or serving elements and heating means for these elements adapted to maintain a predetermined temperature for making coffee and a different predetermined temperature for storing the coffee.

A still further object of the invention is the provision of a coffee maker of the type wherein the coffee liquor is formed by the passage of water through a bed of coffee wherein means are provided for passing the water through the bed at substantially a predetermined and uniform rate of flow and under a predetermined pressure, together with pressure controlled means for regulating the extraction temperature.

We have also aimed to provide a coffee maker of the type having a making pot and a serving pot, wherein novel means are employed for transferring the coffee liquor from the making to the serving pot.

We have further aimed to provide an extraction unit of improved characteristics.

Another object of the invention is the provision in a coffee maker of improved means for controlling the heating means to produce a novel cycle of operations.

Another object of the invention is the provision of a novel method for making coffee.

An important object of our invention is to provide an automatic coffeemaking device in which the functions are controlled by pressure responsive means and temperature responsive means. A further important object of our inveniton is to provide an automatic coffeemaking device characterized by operations of making the coffee and keeping the coffee heated for serving, and the provision of heating means for controlling said operations in combination with control mechanism for the heating means including a pressure responsive control for the coffeemaking operation and a temperature responsive control for the serving period.

Other objects and advantages will appear during the course of the following description and from the accompanying drawings, in which—

Figure 1:
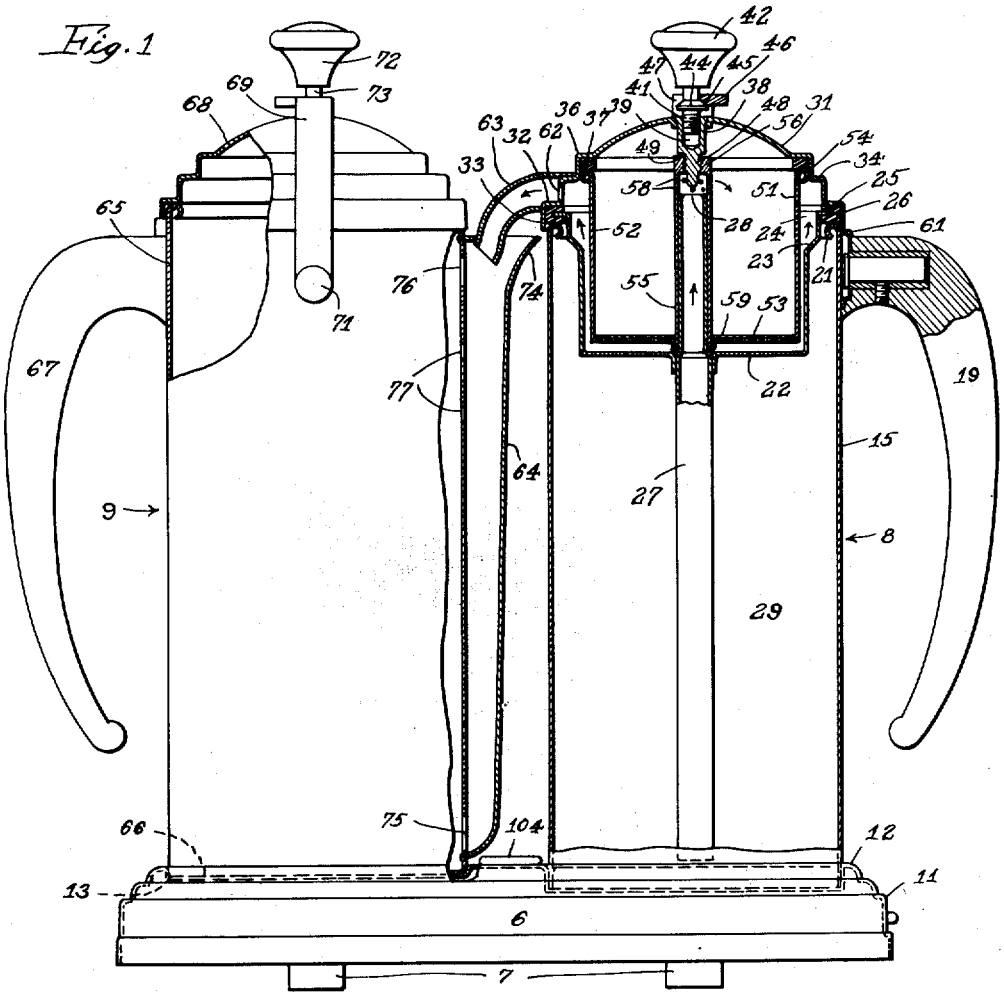
Figure 1 is a side view of a coffee maker embodying our invention, some of the parts thereof being shown in section.

Our invention in its broader aspect contemplates the provision of a coffeemaker in which the coffeemaking functions are automatically performed after the device is started by the operator and the coffee liquor is automatically kept heated for serving. The automatic operations are effected by novel control of the heating means characterized by pressure responsive means which maintains control of the heating means during the coffeemaking period and temperature responsive means which subsequently takes over control of the heating means in a period for serving the coffee. The coffeemaking and serving structure, together with the coacting heating means and the control mechanism may be constructed in various ways to perform the desired automatic operations. In the present application we have shown one embodiment of our invention in which the automatic control includes pressure responsive means which controls heating of the water and displacement thereof from a heating vessel to a container for the ground coffee in which infusion of the coffee takes place. The control mechanism may further include temperature responsive means arranged to automatically take over control of the heating means to keep the coffee liquor at the desired temperature, or approximately so, for serving.

The embodiment of the invention herein shown includes a base designated generally by the numeral 6 having a plurality of legs 7, a making pot designated generally by the numeral 8, and a serving pot 9, the making pot 8 being fixedly attached to the base, and the serving pot 9 being capable of ready removal from the base for the purpose of serving the coffee liquor contained therein. The base 6 is formed, in this instance, from sheet metal to provide an ornamental supporting annular side wall 11 to which the legs 7 are attached and a top surface member 12 forming a heat conducting member. The heat conducting member has a pair of laterally spaced top recesses 13 and 14, the recess 14 being of somewhat greater depth than the recess 13. Cylindrical side walls 15 of the making pot 8 are seated in the recess 14 (Fig. 3), the lower edges of the walls abutting against the heat conducting member 12. A recessed bottom member 16 is seated between the walls 15 and forms the bottom for the pot 8. This bottom member likewise provides a recess for the reception of a heating element 17 held in position by means of a pressure plate 18 which is interposed between the heating element and the heat conducting member 12 at the bottom of the recess 14. The heating element 17 serves to heat the contents of the making pot 8 and simultaneously to heat the heat conducting member 12 for a purpose which will presently appear.

Figure 2:
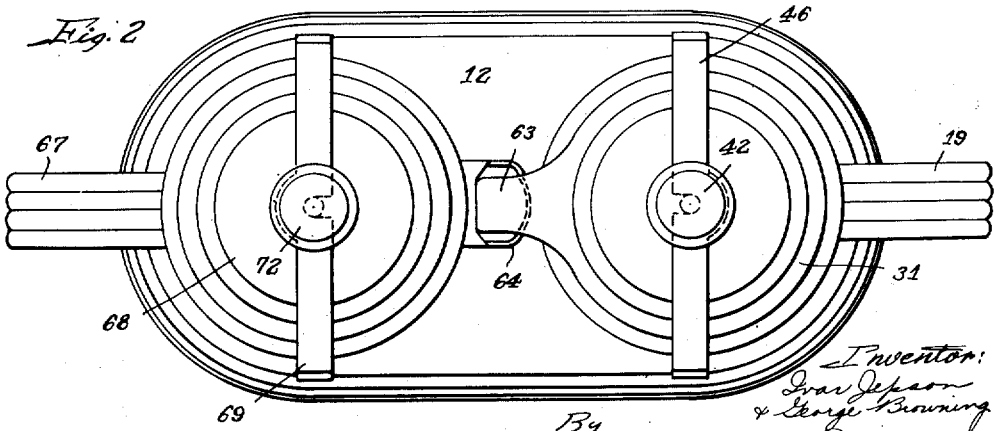
Fig. 2 is a top view of the device shown in Figure 1.

A handle 19 preferably of insulation material such as synthetic resin, is affixed to the side of the making pot 8 adjacent the top thereof and above the end of the base 6, as best shown in Figs. 1 and 2. The upper ends of the side walls 15 are rolled inwardly as shown at 21 for the purpose of providing a seat at the upper open end of the pot 8. Positioned within the pot 8 is a coffee liquor cup 22 of such size as to be completely received in the upper part of the pot 8, the cup 22 being flared outwardly adjacent its upper edge, as shown at 23, for the purpose of forming a ring-like chamber 24, as will presently appear. The upper edge of the liquor cup 22 is flanged, as shown at 25, and has seated thereon a rubber or other resilient gasket 26, the flange 25 and gasket 26 having shape characteristics for seating against the open upper end of the pot 8, as best shown in Figure 1. Axially disposed with respect to the cup 22 is a delivery tube 27 which passes through the bottom of the cup 22 and extends from a point closely adjacent the bottom member 16 of the pot to an elevated point in the cup 22, as shown at 28. It will be noted that when the gasket 26 is firmly seated on the upper end of the pot, the tube 27 comprises the only means of communication between the lower side of the cup 22 and the upper side thereof, the cup thus forming a water chamber designated generally by the numeral 29.

A sheet metal cover designated generally by the numeral 31 has an annular shoulder 32 adapted when the cover is positioned on the top of the pot to abut against the upper side of the gasket 26 and an annular flange 33 extending downward along the outer edge of the gasket to cover and conceal the same. Thus, the gasket 26 serves to provide a water and steam tight joint between the upper end of the pot 8, the cup 22 and the cover when the cover is pressed downward by means presently to be described. The cover has an annular rib 34 arranged to cooperate with the flange 23 of the cup 22 in forming the chamber 24, and a rib 36 adapted to receive and support a gasket 37 of rubber or other suitable resilient material. A thimble 38 is axially positioned in the top and has a threaded bore 39 for the reception of a screw 41 carrying a knob 42. A conical pressure portion 44 encircles the screw 41 and is adapted to engage against a conical seat 45 on a strap 46 when the screw is threaded out of the bore 39. The strap 46 is arcuate in shape and has its ends journaled in the wall 15 of the pot 8 for rotation on a transverse axis from a position to one side of the pot to the position shown in Figs. 1 and 2. The strap has a slot 47 for reception of the screw 41 when the strap occupies the position shown in Figure 1. It will be seen that by rotating the knob 42 the screw 41 may be threaded out of the thimble, thus applying pressure between the shoulder 25 of the top, the gasket 26, and the top edge of the pot 8 so as to seal the junction between these elements. The complementary conical portions 44 and 45 serve to center the strap 46 on the screw 41 and to prevent the strap from creeping under rotative movement of the screw.

The lower end of the thimble 38 has a threaded portion 48 of reduced cross-section providing a shoulder 49, these elements acting to support a coffee container or cup 51 on the top. The cup 51 has cylindrical side walls 52 and a perforated flat bottom 53, the upper edges of the side walls being rolled as shown at 54 for abutment against the gasket 37. A sleeve 55 extends upward axially in the cup and at its upper end has an internally threaded portion 56 arranged to cooperate with the threaded portion 48 to draw the upper edges of the cup firmly against the gasket and thus produce a water-tight joint. Other devices may be employed to produce a seal between the coffee container and the cup 22 with satisfactory results. The sleeve 55 is of such internal diameter as to closely receive the upper end of the delivery tube 27, and is provided with a plurality of small openings 58 above the upper end of the tube 27, the openings being uniformly distributed annularly of the sleeve such that water passing upward through the tube 27 will be uniformly discharged from the sleeve in all directions.

The operation of the coffee making pot is substantially as follows: The cover 31 and attached cup 51 are removed from the top of the pot releasing the cup 22, gaskets 26 and tube 27, which are then removed from the pot. The required amount of water is then placed within the water chamber 29 through the open end of the pot. The cup 22 with its attached tube 27 and gasket 26 are then dropped into the end of the pot. The coffee cup 51 is unscrewed from the cover and the required amount of coffee is inserted into the cup. A filter paper 59 may be inserted across the perforated bottom 53 if desired. The coffee cup 51 is then again attached to the cover with the upper edge 54 thereof firmly abutting the gasket 37, whereupon the cover and attached cup are lowered into the liquor cup 22 with the sleeve 55 passing over the upper end of the tube 27. A lug 61 is positioned on the outer side of the wall 15 and cooperates with the flange 33 of the cover to locate the cover on the pot. Current is then supplied to the heating element 17 and when sufficient steam pressure is generated within the water chamber 29, the water will be forced up the tube 27 and out through the openings 58 onto the coffee into the cup 51, filling this cup and forcing the hot water through the bed of coffee and out through the perforations in the bottom 53. The coffee liquor resulting from this extraction operation passes upwardly between the outer wall of the cup 51 and the inner wall of the cup 22 into the annular chamber 24 and thence to an opening 62 in the cover, discharging into a spout 63 attached to the cover from which the coffee liquor is discharged into a pouring spout 64 of the serving pot 9. When all of the water has thus been displaced from the chamber 29, steam under some pressure will follow upward through the tube 27 causing the remainder of the liquid to be displaced from the cup 51 and from the chamber 24 surrounding the cup 51 leaving these elements at the close of the coffee making operation substantially free of liquid.

The serving pot 9 is substantially identical in outer appearance with the making pot 8, with the exception of the spouts 63 and 64. The serving pot has cylindrical side walls 65, a bottom 66, and a handle 67, the handle being the counterpart of the handle 19 and likewise located. The pot has a cover 68 substantially similar in shape to the cover 31, a strap 69 pivotally supported on the side walls of the pot as shown at 71 and similar to the strap 46, a knob 72 similar to the knob 42, and a screw 73 shaped, located, and operated in the same manner as the screw 44. Positioned on the side wall of the pot opposite the handle 67 is the spout 64 which extends substantially from top to bottom of the pot as shown in Figure 1. This spout provides a channel for the reception of the coffee liquor from the making pot, the liquor being discharged slightly below the flared outer end 74 of the pouring spout. The side wall 65 of the serving pot is provided with a relatively large opening 75 at the lower end of the spout 65 and with a relatively large opening 76 adjacent the top of the spout. A plurality of smaller openings 77 are located below the opening 76 but adjacent the upper end of the spout 64. Through the provision of the openings 75, 76 and 77 spaced in the manner shown in Figure 1, the coffee entering the serving pot is given a considerable degree of turbulence since a part of the liquor will enter through the opening 76, an additional part through the openings 77, and the remainder through the opening 75. Through this arrangement uniformity of the coffee liquor in the serving pot is obtained as a result of its discharge into the pot. This arrangement prevents stratification of the coffee liquor in the serving pot. It will be understood that otherwise the coffee liquor discharged from the discharge spout 63 may be of different character during the early part of the coffee maker operation from that discharged during the latter part. In fact, in some instances the discharge from the spout 63 may run practically clear at the end of the coffee making operation.

It will be seen that the serving pot 9 is arranged for convenient removal and replacement on the base 6, and that the base 6 and serving pot are arranged for convenient replacement of the pot in the proper location and space arrangement with respect to the making pot 8. Thus the serving pot seats in the recess 13 of the heat conducting member 12 which acts to locate the lateral position of the pot. At the same time the discharge spout 63 is received in the pouring spout 64 in such manner that the serving pot may be raised vertically to a limited extent sufficient to permit the pot to be tilted so that the bottom thereof may be removed from the recess 13 and the pot transported as desired in the dispensing of the coffee. The relationship between the spouts 63 and 64 is, however, such that the entire coffee maker may be handled by grasping the handle 67 since vertical movement of the pot 9 is permitted to only a limited extent. Because of this limit in the relative vertical movement of the pots, the coffee maker may be handled as a unit by simultaneous manipulation of the handles 19 and 67.

Figure 3:
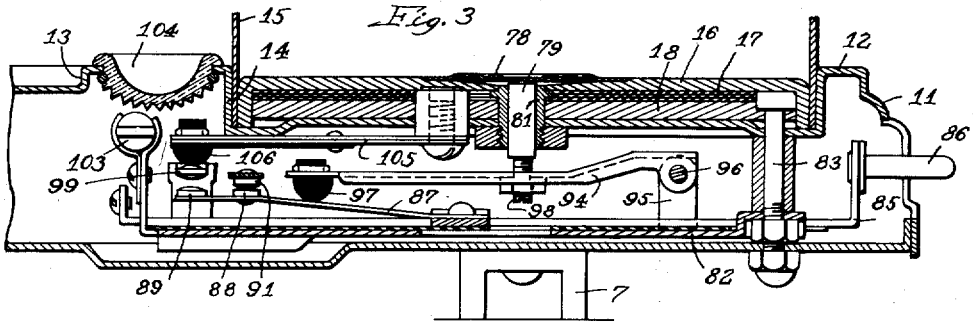
Fig. 3 is a fragmentary vertical section through the base and the lower part of the making pot.
Figure 4:
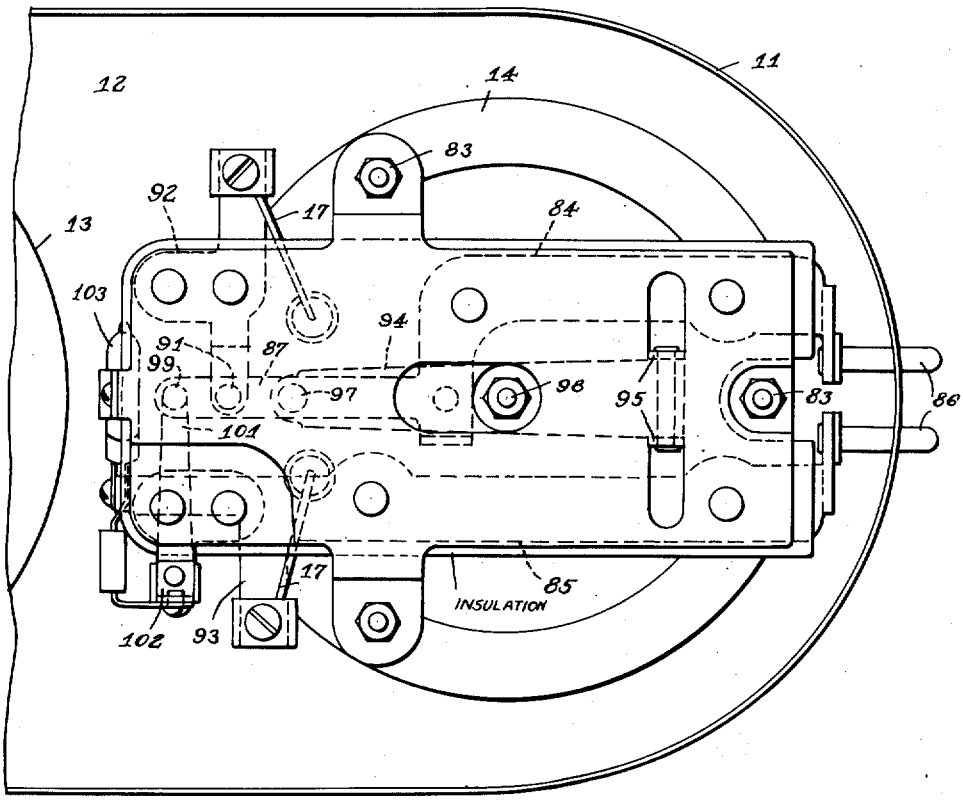
Fig. 4 is a bottom view of that portion of the base shown in Fig. 3 with the bottom cover plate removed.
Figure 5:
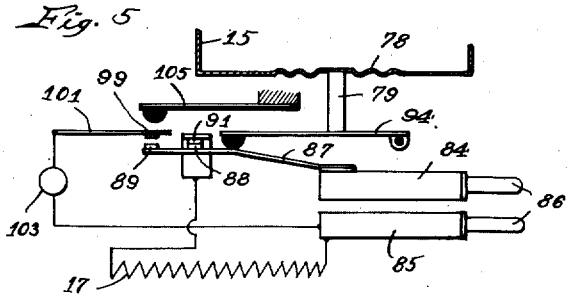
Fig. 5 is a wiring diagram.

It will be seen that because of the location of the serving pot 9 upon the heat conducting plate 12, the heating element 17 is not only effective to heat the contents of the making pot, but is also effective to heat the coffee stored in the serving pot. To accomplish this and other results, we have provided novel control means for the heating element which is effective to control the coffee making operations and the heating of the stored coffee. To this end we provide a pressure responsive element 78 positioned in the bottom 16 of the making pot adapted to actuate a pin 79 carried in a sleeve 81 passing through the bottom 16, the heating element 17, the plate 18, and the heat conducting member 12, and thus extending into the hollow base 6 (Fig. 3). The pressure responsive element 78 is arranged to move the pin 79 downwardly facing Fig. 3 upon increasing temperature against the tension of spring 87, the spring acting to return the pin upon decrease of pressure. A plate 82 is attached to the heat conducting member 12 by means of bolts 83, and is arranged to carry switch mechanism for opening and closing the circuit to the heating element 77. Positioned on the plate 82 and insulated therefrom are bus-bars 84 and 85 (Fig. 4) carrying terminal posts 86 of conventional form for attachment to a source of current supply. Electrically connected to the bus-bar 84 is a spring pressed contact lever 87 having contacts 88 and 89. Opposed to the contact 88 is a stationary contact 91 electrically connected to one terminal of the heating element by a connector member 92. The opposite terminal of the heating element is connected to the bus-bar 85 through a connector 93 and consequently, when the contacts 88 and 91 are made, current will flow through the heating element 17 and when opened, current will cease to flow. The lever 87 is tensioned in such a manner as to close these contacts if unrestrained. A switch-actuating lever 94 is journaled on ears 95 as shown at 96 and carries at its free end a button 97 of insulation material such as porcelain. Intermediate the ends of the lever 94 and in cooperative relationship with the pin 79 is an adjusting screw and nut 98 which may be set to predetermine the relationship between the position of the pin 79 and the button 97 so that at a predetermined pressure within the making pot, the button will be forced against the contact lever 87 opening the contacts 88 and 91 and terminating the flow of current through the heating element, thereby rendering the heating of the making pot responsive to the pressure within the pot. Opposed to the contact 89 is a contact 99 carried on a spring-pressed blade 101 supported on a connector 102 attached to the plate 82 and insulated therefrom. The contact 99 is electrically connected to a lamp bulb 103, the circuit through which is completed through the connector 93 and bus-bar 85. A lens or window 104 is positioned in the heat conducting plate 12 between the two pots so as to render the light from the lamp 103 visible from the exterior of the base. A bi-metal blade 105 is attached to the heat conducting member 12, passing through the plate 18 and heating element 17 as shown in Fig. 3 in such manner that the surface of the blade contacts the lower surface of the heat conducting member when the element is cold. The free end of the bi-metal element has a button 106 of suitable insulation, an example of which may be porcelain, adapted upon increase in temperature of the member 12 and heating element to come into contact with the contact blade 101 and force this against its normal spring pressure so as to close the contacts 89 and 99, whereupon current will flow through the lamp, as will be obvious from Fig. 5. Upon a small further increase in the temperature of the bi-metal element and consequent additional movement thereof the contact 88 will be moved against the tension of its spring support so as to open the contacts 88 and 89, thereby cutting off the heating element. Likewise, when the bi-metal element cools slightly the contacts 88 and 89 will again be made and the heating element energized, this cycle being repeated to maintain substantially uniform temperature. During this cycle the contacts 89 and 99 will remain continuously closed.

The control mechanism is so set that the opening and closing of the contacts 88 and 91 is entirely under the control of the pressure responsive means while there is water in the making pot. In one suitable example the pressure mechanism is arranged so that the contact points will be opened when the pressure in the making pot is in the region of four to five pounds, and the bi-metal element is set to open the contact points when the bi-metal blade reaches a temperature in the neighborhood of 225° F. Through this arrangement we are enabled to maintain a predetermined low temperature during the coffee making operations and a predetermined higher temperature upon the completion of the coffee making operations for the purpose of conducting heat to the serving pot through the heat conducting plate 12. These temperatures are relative only to the particular embodiment of our invention here shown, it being manifest that in this case the water will be heated sufficiently for the coffee infusion process but not to such a high temperature as to cause extraction of injurious or objectionable oils from the ground coffee, and that the above mentioned higher temperature of the bi-metal blade at the time of opening the contact points is reached only during the second control period and after the coffeemaking operation has been completed and the coffee liquor is being kept heated for serving. The said higher temperature of the bi-metal blade is utilized in this embodiment only because of the remote association of the containing means for the coffee liquor, that is, the use of a liquid containing means including as a component thereof a serving pot in heat transfer relation to and spaced at one side of the heating element so that there is considerable temperature lag in the transfer of heat from the heating means to the serving pot. With this construction the temperature responsive means operates in a range to keep the coffee liquor heated for serving and the actual temperature of the coffee liquor will be lower than the temperature to which the water is heated in the coffeemaking operation. It will be seen that the pressure element 78 will be effective to open and close the switch formed by the contacts 88 and 91 so long as water remains in the making pot. However, as pressure is developed on the water in the water chamber 29, the water is displaced upward through the delivery tube 27 and out of the pot, as heretofore described, the rate of delivery of the water through the tube 27 and the rate of its passage through the bed of ground coffee will be held substantially constant in response to the constant pressure maintained in the water chamber as a result of the recurrent opening and closing of the circuit by the pressure responsive means. When all of the water has been displaced, the excess steam will likewise pass out through the tube 27, whereupon the pressure on the pressure responsive element 78 will drop substantially to atmospheric, permitting the closing of the switch. Thereupon the heating element is energized and the temperature surrounding the heating element will increase until the switch is opened by operation of the bi-metal element 105. This element will then function in the manner described to maintain a substantially uniform temperature of the heat conducting member 12 and maintain the coffee stored in the serving pot at a substantially uniform temperature.

It will be seen that because of the nature of the control mechanism, we are enabled to employ a heating element of high wattage capable of bringing the water in the making pot to a boiling temperature in very short time, thus reducing to a minimum the time required for the making of coffee, since the pressure responsive mechanism functions to control the heating element at the moment the required temperature is reached to produce the nicety of operation required in the production of good coffee. In other words, during the period in which the water is being brought up to a suitable temperature for the making of coffee, we are enabled to have an abundance of heat which is promptly reduced to a relatively small amount when the water reaches the required temperature. Likewise, when the making of the coffee has been completed, the control means automatically and in response to the completion of the coffee making operations produces additional heat for the purpose of heating the serving pot. During the actual extraction operation the pressure control mechanism acts to maintain a substantially uniform pressure and therefore a substantially uniform rate of flow through the coffee, as distinguished from an increasing rate of flow such as would otherwise occur as a result of which the desired material is extracted from the coffee and the undesirable portion allowed to remain.

Attention is directed to the fact that the entire operation of the coffee maker is automatic in that the water and coffee are placed in the making pot and current supplied to the device. In other words, the operator places the device in condition for operation by adding the required amount of water and ground coffee and then starting the automatic operation by plugging in or connecting the terminals 86 to the current supply. Thereafter it is not necessary for the operator to do anything prior to the serving of the coffee, but merely to pick up the serving pot and pour the coffee liquor.

Attention is directed to the construction of the extraction portion of the coffee making pot in that the coffee or the coffee liquor never comes into contact with the pot proper so that this portion of the device never needs to be washed. In cleaning the device it is only necessary to remove the cups 22 and 51 and the cover 31 which may be conveniently washed and replaced. This is further facilitated by the fact that the steam which comes through these parts of the device at the end of the coffee making operation forces substantially all of the water and coffee liquor out of the cups so that these elements are substantially free from liquid upon the termination of the coffee making operations. This facilitates the removal of the coffee grounds from the cup 51, and also prevents after dripping from the spout 63. In other words, at the conclusion of the coffee making operation there is no remaining liquid within the pot to drip from the spout 63 when the serving pot is removed from beneath this spout.

Another feature of the invention lies in the construction of the pouring spout 64 wherein the vertically spaced openings 75—77 are provided which brings about uniformity in the coffee in the serving pot. Likewise, this spout cooperates with the spout 63 and the handles 19 and 67 in transporting the coffee maker as a unit.

Another feature of our invention is the provision for automatically controlling the coffeemaking operation by pressure responsive means and temperature responsive means. The pressure responsive means functions in a first period for controlling the heating means during the coffeemaking operation and the temperature responsive means functions in a second period to control the heating means to keep the coffee liquor heated to an approximate temperature for serving. In the preferred embodiment the automatic control mechanism functions so that the temperature responsive means takes over the control after the coffeemaking operation has been completed under control of the pressure responsive means. Another feature of our invention is that the pressure and temperature responsive controls are coordinated for the purpose of effecting prompt change of control at a predetermined time in the coffeemaking operation so as to avoid undesirable high temperatures and undesirable temperature lag in such coffeemaking operation. In the preferred embodiment the temperature responsive means takes over the control of the heating means after the pressure responsive means becomes ineffective at the end of the coffeemaking operation. It should be manifest that the principles of control for automatic coffeemaking herein disclosed may be applied in various modifications.

It will also be observed that in the embodiment herein disclosed the signal light 103 is on only when the coffee is completely made and ready for serving. In other words, this light is on continuously so long as there is coffee being heated in the server. This continuous light is due to the action of the thermostat 105 against the contacts 89—99 and the flexibility of the end portion of the spring 87 between the contacts 88 and 89 which is sufficient to take care of lag in cooling so that the light circuit stays closed.

It will be understood that the foregoing description and accompanying drawings are by way of illustration, and we do not wish to be limited except as required by the prior art and the scope of the appended claims.

We claim:

1. A device of the character described comprising in combination a serving pot adapted to hold coffee liquor during a storage interval, a making pot arranged to make the coffee and discharge the liquor into the serving pot, means for heating said pots, and control means for said heating means for maintaining a predetermined making temperature during the making interval and a predetermined different temperature during the storage interval.

2. A device of the character described comprising a serving pot adapted to hold coffee liquor during a storage interval, a making pot arranged to make the coffee liquor and discharge the same into the serving pot, means for heating said pots, and control means for the heating means comprising means for maintaining a predetermined coffee making temperature during the making interval, and means rendered operative in response to said discharge of liquor for maintaining a predetermined temperature during the storage interval.

3. A device of the character described comprising a base having a heat conducting member, a making pot and a serving pot positioned on said member, an electric heating element in said base in close proximity to said making pot and more remote from said serving pot, and control means for said heating element for maintaining the member at a predetermined lower temperature for making coffee in the making pot and thereafter at a predetermined higher temperature for keeping the liquor in the serving pot at a serving temperature.

4. A device of the character described comprising a serving pot, a making pot adapted to hold water having a coffee container, and means for conducting water under pressure from said pot through said coffee container and to the serving pot, means for heating said making pot to develop pressure therein, and control means for said heating element comprising pressure responsive means for maintaining a predetermined pressure in the making pot during the passage of water therefrom to control the rate of passage of the water through said coffee container.

5. A device of the character described comprising a serving pot, a making pot adapted to hold water having a coffee container, and means for conducting water under pressure through a single cycle from said pot through said coffee container and to the serving pot, means for heating said making pot to develop pressure therein, control means for said heating element comprising pressure responsive means for maintaining a predetermined pressure in the making pot during the passage of water therefrom, and temperature responsive means for controlling said element after the passage of the water from the making pot.

6. A device of the character described comprising a serving pot, a making pot adapted to hold water having a coffee container, and means for conducting water under pressure from said pot through said coffee container and to the serving pot, means for heating said making pot to develop pressure therein, control means for said heating element comprising pressure responsive means for maintaining a predetermined pressure in the making pot during the passage of water therefrom, temperature responsive means for controlling said element after the passage of the water from the making pot, and signal means operative in response to passage of liquid from one pot to the other for indicating when the water has passed from the making pot.

7. The combination in a coffee maker of a serving pot, a making pot adapted to discharge coffee liquor into the serving pot, heating means for said pots, means for maintaining a predetermined temperature in the making pot during the making of coffee therein, signal means, and means responsive to the increase of temperature of the making pot to initiate the signal means to indicate the completion of the coffee making operations.

8. The combination in a coffee maker of a base having a heat conducting member, a serving pot located thereon, a making pot thereon adapted to prepare and discharge coffee liquor into the serving pot, a heating element for said heat conducting member in direct heat conducting relation to the making pot and more remote from said serving pot to heat the making pot for the coffee making operations and the serving pot for storage of the liquor, means for controlling said element in response to pressure in the making pot during the making of coffee, and temperature responsive means for indicating the completion of the making operations and for controlling said element to heat the serving pot.

9. The combination in a coffee maker of the type having a serving pot, a making pot and means for conducting water from the making pot to the serving pot at a predetermined pressure in the making pot, of a heating element for heating said pots, contacts for controlling the flow of current to said element, means for actuating said contacts in response to changes in pressure in said making pot to maintain a predetermined pressure during the making of coffee liquor, and means for actuating said contacts solely in response to temperature changes to maintain a predetermined temperature of said serving pot.

10. The combination in a coffee maker of the type having a serving pot, a making pot and means for conducting water from the making pot to the serving pot at a predetermined pressure in the making pot, of a heating element for heating said pots, contacts for controlling the flow of current to said element, means for actuating said contacts in response to changes in pressure in said making pot to maintain a predetermined pressure during the making of coffee liquor, signal means, signal contacts for controlling the flow of current thereto, and means rendered operative in response to absence of water in the making pot for closing said signal contacts and for actuating said first mentioned contacts in response to temperature changes.

11. The combination in a coffee maker of a making pot adapted to hold water and discharge the same upon the development of steam pressure thereabove to prepare a coffee liquor, a serving pot positioned adjacent thereto for the reception of said liquor, a heating element for said making pot, means for heating the serving pot by conduction from said heating element, switch means for controlling said heating element, means responsive to the changes in pressure within the making pot for actuating said switch to maintain a predetermined pressure therein, and thermostat means rendered operative in response to the discharge of water from said making pot for actuating said switch for maintaining a predetermined temperature adjacent said element to heat said serving pot.

12. The combination in a coffee maker of a making pot adapted to hold water and discharge the same upon the development of steam pressure thereabove to prepare a coffee liquor, a serving pot positioned adjacent thereto for the reception of said liquor, a heating element for said making pot, means for heating the serving pot by conduction from said heating element, switch means for controlling said heating element, means responsive to changes in pressure within the making pot for actuating said switch to maintain a predetermined pressure therein, thermostat means rendered operative in responsive to the discharge of water from said making pot for actuating said switch for maintaining a predetermined temperature adjacent said element to heat said serving pot, and signal means operated by said thermostat means for indicating when the heating element is under the control of said thermostat means.

13. The combination in a coffee maker having a heating element, of control means comprising a spring-pressed contact carrier having spaced contacts, one of said contacts serving to open and close the circuit through said heating element, pressure responsive means for actuating said carrier to control the last mentioned contact, signal means, a movable contact opposed to the other of the contacts on said carrier, and thermostat means for moving said movable contact into engagement with said other contact to energize said signal means and subsequently to move said contact carrier to control said heating element.

14. A cooking device comprising in combination a serving pot adapted to hold coffee liquor during a storage interval, a making pot arranged to make the coffee and discharge the liquor into the serving pot, means for heating said pots, and control means for said heating means for maintaining a making temperature during the making interval and a different temperature during the storage interval.

[15. A coffeemaking device having a container for ground coffee, liquid containing means including a vessel in which water is adapted to be heated and pressure generated for delivery of the heated water to the ground coffee container in performance of the coffeemaking operation, said liquid containing means adapted to receive the coffee liquor after infusion in the ground coffee container, electric heating means associated with the liquid containing means for heating the water in said coffeemaking operation, and a control for said electric heating means to cause electric current to flow through the heating means for performance of said coffeemaking operation and having means responsive to pressure in the water container to maintain said flow of electric current to the heating means in predetermined relation to said pressure whereby to maintain substantially uniform rate of flow of the heated water from the water container to the coffee container and whereby to quickly terminate said flow of electric current upon sudden drop of said pressure due to delivery of substantially all of the water to the coffee container.]

16. A coffeemaker having a container for the ground coffee, a container for the water, means for heating the water, means associating said containers so that hot water is delivered from the water container to the coffee container in the operation of making the coffee, a control for said heating means including pressure responsive means responsive to pressure in the water container to control the coffeemaking operation and including temperature responsive means to automatically take control of said heating means after the functioning of said pressure responsive means to keep the coffee liquor heated for serving.

17. An automatic coffeemaking device including a container for ground coffee in which infusion of hot water and the ground coffee takes place, liquid containing means including a vessel in which water is adapted to be heated for delivery to the coffee container in the operation of making the coffee and in which means the coffee liquor is subsequently stored for serving, electric heating means for heating said liquor containing means, and control mechanism for the heating means including means responsive to pressure in the said vessel to automatically control the heating means through the coffeemaking operation and thermally responsive means to subsequently automatically control said heating means to keep the coffee liquor heated for serving.

18. An automatic coffeemaking device having a lower vessel, an upper vessel, a tube depending from the upper vessel into the lower vessel, electric heating means for heating water in the lower vessel and causing the water to be delivered through said tube into the upper vessel, control means responsive to pressure within the lower vessel to automatically effect change of heat transfer to the lower vessel at a predetermined high pressure in the delivery of water through the tube to the upper vessel, and temperature responsive means to automatically effect recurrent increase and reduction of heat transfer from said heating means to maintain the device within a temperature range different from that of said control means for keeping the coffee heated for serving.

19. An automatic coffeemaking device including a container for ground coffee in which infusion of hot water and the ground coffee takes place, liquid containing means including a vessel in which water is adapted to be heated for delivery by pressure to the coffee container in the operation of making the coffee, said liquid containing means also being adapted for holding the coffee liquor for serving, electric heating means for heating said liquid containing means, and control mechanism for the heating means including circuit interrupting contacts operable to open and close the circuit for all heat control operations, means responsive to pressure within the liquid containing means to automatically control said contacts within a predetermined temperature range until substantially all of the water has been delivered to the ground coffee container, and means responsive to temperature of the device to automatically control said contacts within a predetermined temperature range different from said first mentioned temperature range to keep the coffee liquor heated for serving.

20. An automatic coffeemaking device including a container for ground coffee in which infusion of hot water and the ground coffee takes place, liquid containing means including a vessel in which water is adapted to be heated for delivery by pressure to the coffee container in the operation of making the coffee, said liquid containing means also being adapted for holding the coffee liquor for serving, electric heating means for heating said liquid containing means, and control mechanism for the heating means including a circuit for the heating means having a single set of circuit interrupting contacts operable to open and close the circuit for all heat control operations, said contacts being biased to closed position for starting the coffeemaking operation, means responsive to pressure in the liquid containing means to automatically control said contacts within a predetermined temperature range until substantially all of the water has been delivered to the ground coffee container, and means responsive to temperature of the device to automatically control said contacts within a predetermined temperature range different from said first mentioned temperature range to keep the coffee liquor heated for serving.

21. An automatic coffeemaking device in which the water is heated by electric heating means and delivered to the ground coffee by pressure generated by such heating in a coffeemaking operation and in which the coffee liquor is delivered from the ground coffee ready for serving, including control mechanism for the electric heating means having means responsive to said pressure for controlling the coffeemaking operation and means automatically operative following said coffeemaking operation and responsive to temperature of the device for controlling the temperature at which the coffee liquor is kept for serving.

22. A coffeemaking device including a container for ground coffee, liquid containing means in which water is adapted to be heated and from which it is displaced by pressure to the ground coffee container in the operation of making the coffee, electric heating means for heating the liquid containing means and causing the water to be so displaced, and control mechanism for the heating means including contacts for interrupting the heating circuit, said contacts being closed to start the heating of the water, means responsive to pressure in the vessel to automatically control the operation of said circuit in the operation of making the coffee, and means responsive to predetermined low and high temperatures of the liquid containing means to automatically recurrently close and open the heating circuit after the coffee has been made to keep the coffee liquor heated for serving.

23. A coffeemaking device having means for automatically controlling the operations of making the coffee and keeping the coffee heated for serving, including a vessel in which water is adapted to be heated and from which it is displaced by pressure for infusion with the ground coffee in the operation of making the coffee, electric heating means for heating the vessel and causing the water to be so displaced, a circuit for the heating means including circuit interrupting contacts, a diaphragm responsive to pressure within the vessel during said coffeemaking operation to open said contacts at a predetermined pressure, and a thermostat responsive to temperature of the vessel to open and close said contacts, said circuit being automatically controlled by the pressure responsive diaphragm during the coffeemaking operation and being automatically controlled by said temperature responsive means after said functioning of the pressure responsive diaphragm to keep the coffee liquid heated for serving.

24. An automatic coffeemaking device having in combination, a container for ground coffee, liquid containing means including a vessel in which water is adapted to be heated and pressure generated for delivery of the heated water to the ground coffee container in performance of the coffeemaking operation, said liquid containing means adapted to receive the coffee liquor after infusion in the ground coffee container, heating means associated with said liquid containing means and operable through a first period for heating the water in the coffeemaking operation and through a second period after the coffee is made for keeping the coffee liquor heated for serving, means operable to start the heating means for starting said first period of operation, and control mechanism to subsequently automatically control the heating means including means responsive to pressure in said vessel to control the heating means in the coffeemaking operation, and said control mechanism including means responsive to predetermined low and high temperatures of the device to control the heating means to keep the coffee liquor heated in said liquid containing means for serving.

25. A coffeemaking device having, in combination, a container for the ground coffee, liquid containing means including a vessel closed except for a passage communicating with said container, electric heating means associated with said liquid containing means adapted to operate in a first period to heat water in said vessel and cause it to be delivered to said container by pressure within the vessel for infusion with the ground coffee and to operate in a second period to heat the coffee liquor after the latter has been delivered from said container to the liquid containing means for serving, and control mechanism for the heating means including means responsive to pressure in said vessel for controlling said first period of operation and means automatically operative following said first period of operation and responsive to temperature of the device for controlling said second period of operation.

26. A coffeemaking device having means for automatically controlling the operations of making the coffee and keeping the coffee at an approximate temperature for serving, including liquid containing means in which the water is adapted to be heated and from which it is displaced in the operation of making the coffee, the liquid containing means serving also to hold the coffee liquor after the coffeemaking operation, electric heating means for heating the liquid containing means and causing the water to be displaced in the coffee-making operation, a circuit for the heating means including circuit interrupting means, control mechanism for said circuit interrupting means to control the coffeemaking operation in a first period and to maintain the coffee liquor at a serving temperature in a second period, and a signal means actuated by said control mechanism to effect a signal only for said second period.

27. In a cooking device, a pressure vessel for use in the cooking operation, electric heating means for heating said vessel, a pressure responsive control for said heating means to maintain a predetermined pressure in said vessel during the cooking operation, and temperature responsive means to prevent overheating of the vessel after the vessel becomes dry.

28. In a cooking device, in combination, a food container, a vessel associated therewith in which water is adapted to be heated for performance of the cooking operation, electric heating means for heating said vessel, and control mechanism for the heating means including means responsive to the pressure in said vessel resulting from heating the water, said pressure responsive means serving to control said heating means through the cooking operation and being ineffective to perform its said control function when the pressure in said vessel drops below a given point, and said control mechanism including means responsive to temperature of the device to automatically take over control of said heating means after the control thereof by said pressure responsive means to maintain the device within a predetermined temperature range.

29. In combination, a vessel, electric heating means for heating the vessel, and a control for the heating means comprising a circuit having a switch biased to closed position, a diaphragm responsive to pressure within the vessel generated by heating the contents thereof, a switch-actuating lever operable between the diaphragm and the switch to recurrently open and close the switch to maintain a predetermined pressure and temperature range within the vessel, and thermally responsive means including a thermostat responsive to temperature of the vessel and arranged to automatically take over control of said switch when the pressure in the vessel drops below a predetermined point, the thermostat acting to recurrently open and close the switch to maintain the vessel at a predetermined temperature range different from that effected by said pressure control.

30. The combination set forth in claim 29, including an adjustment between the diaphragm and the switch-actuating lever to predetermine the relationship between the postion of the diaphragm and the lever so that the lever will cause the switch to open the circuit at a predetermined pressure within the vessel.

31. The combination set forth in claim 29, including a signal in the circuit and a switch for the signal arranged in coaction with the thermally responsive means to be continuously closed when said thermally responsive means is in control of the heater switch.

32. A coffeemaking device having in combination, a container for ground coffee, liquid containing means including a vessel in which water is adapted to be heated and pressure generated for delivery of the heated water to the ground coffee container in performance of the coffeemaking operation, said liquid containing means adapted to receive the coffee liquor after infusion in the ground coffee container, electric heating means associated with the liquid containing means and operable through a first period for heating the water in the coffeemaking operation and through a second period after the coffee is made for keeping the coffee liquor heated for service, and control mechanism responsive to pressure within said vessel to control the electric heating means to maintain substantially uniform rate of flow of the heated water from the vessel to the ground coffee container during the coffeemaking operation, said control mechanism including thermostat means adapted to take over control of the electric heating means following said coffeemaking operation and responsive to predetermined low and high temperatures of the device to control the heating means to keep the coffee liquor heated in said liquid containing means for serving.

33. *The automatic coffeemaking device of claim 17 wherein said means responsive to pressure is operative to maintain a substantially uniform rate of flow of heated water from said liquid containing means to said container for ground coffee.*

IVAR JEPSON.
GEORGE BROWNING.

(References on following page)

References Cited in the file of this patent or the original patent

UNITED STATES PATENTS

| Number | Name | Date |
|---|---|---|
| 1,171,022 | Ciletti | Feb. 8, 1916 |
| 1,389,628 | Clark | Sept. 6, 1921 |
| 1,774,927 | Lambert | Sept. 2, 1930 |
| 1,920,284 | Wells | Aug. 1, 1933 |
| 1,922,782 | Challis | Aug. 15, 1933 |
| 1,931,190 | Goughnour | Oct. 17, 1933 |
| 2,025,302 | Olds | Dec. 24, 1935 |
| 2,026,596 | Ross | Jan. 7, 1936 |
| 2,067,918 | Harper | Jan. 19, 1937 |
| 2,117,729 | Keaton | May 17, 1938 |
| 2,119,455 | De Ayala | May 31, 1938 |
| 2,150,801 | Keaton | Mar. 14, 1939 |
| 2,169,852 | Scott | Aug. 15, 1939 |
| 2,194,117 | Graham | Mar. 19, 1940 |
| 2,212,100 | Keaton | Aug. 20, 1940 |
| 2,269,111 | Jepson et al. | Jan. 6, 1942 |

FOREIGN PATENTS

| Number | Country | Date |
|---|---|---|
| 20,352 | Great Britain | Dec. 30, 1893 |
| 319,164 | France | Nov. 6, 1902 |
| 415,243 | Germany | June 16, 1925 |